United States Patent [19]

Pedu

[11] Patent Number: 4,575,103

[45] Date of Patent: Mar. 11, 1986

[54] MAGNETIC SEAL FOR MAGNETIC PARTICLE CLUTCHES AND BRAKES

[76] Inventor: Alexander A. Pedu, 100 River St., Lake Placid, N.Y. 12946

[21] Appl. No.: 598,465

[22] Filed: Apr. 9, 1984

[51] Int. Cl.[4] .............................................. F16J 15/40
[52] U.S. Cl. ..................................... 277/80; 277/135
[58] Field of Search ............. 277/80, 1, 135, DIG. 7, 277/DIG. 8

[56] References Cited

U.S. PATENT DOCUMENTS

| | | | |
|---|---|---|---|
| 2,713,927 | 7/1955 | Rabinow | 277/80 X |
| 2,834,618 | 5/1958 | Wiltse | 277/80 X |
| 2,863,538 | 12/1958 | Jaeschke | 277/80 X |
| 2,974,981 | 3/1961 | Vervest et al. | 277/80 |
| 2,987,153 | 6/1961 | Perry | 277/80 X |
| 2,996,162 | 8/1961 | Lehde | 277/80 X |
| 3,254,745 | 6/1966 | Isakov et al. | 277/80 X |
| 3,834,775 | 9/1974 | Tuffias et al. | 277/80 X |
| 4,077,508 | 3/1978 | Pedersen | 277/80 X |
| 4,171,818 | 10/1979 | Moskowitz et al. | 277/80 |
| 4,252,353 | 2/1981 | Raj et al. | 277/80 |
| 4,315,827 | 2/1982 | Bottenberg et al. | 252/62.51 R |

FOREIGN PATENT DOCUMENTS

| | | | |
|---|---|---|---|
| 1119965 | 4/1956 | France | 277/80 |
| 58-137669 | 8/1983 | Japan | 277/80 |
| 875152 | 10/1981 | U.S.S.R. | 277/80 |

*Primary Examiner*—Robert S. Ward
*Attorney, Agent, or Firm*—Schiller & Pandiscio

[57] ABSTRACT

A novel seal for a magnetic particle brake or clutch of the type having a rotatable shaft made of a non-magnetic material. The seal comprises (a) one or more permanent magnets adapted to be mounted in close proximity to but not engaging the adjacent surface of the rotatable shaft or a movable member that is exposed to the magnetic particles, and (b) means for mounting the one or more magnets and protecting them from excessive external magnetic fields.

12 Claims, 12 Drawing Figures

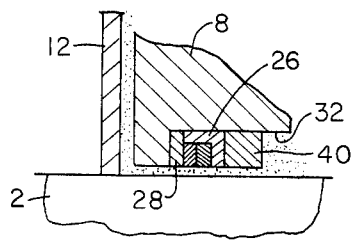
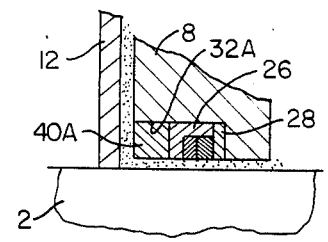
FIG. 4
FIG. 5
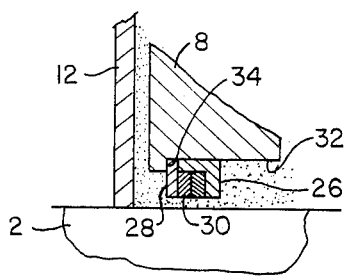
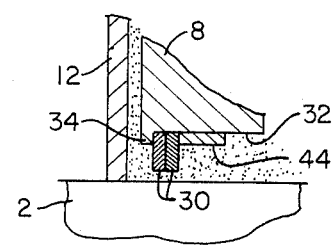
FIG. 6
FIG. 7
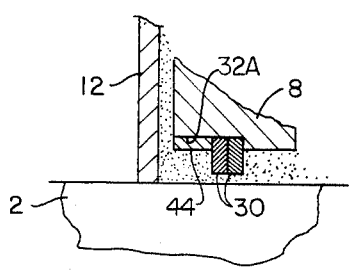
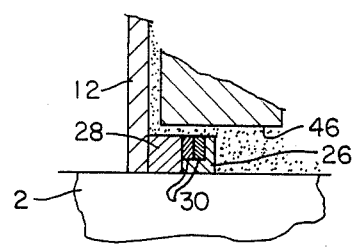
FIG. 8
FIG. 9

MAGNETIC SEAL FOR MAGNETIC PARTICLE CLUTCHES AND BRAKES

This invention relates to shaft seals and more particularly to improved seals for magnetic particle devices, such as clutches, brakes and clutch/brake combinations, that use magnetic particles to couple two rotary members for torque transmission.

PRIOR ART

Magnetic particle devices such as clutches, brakes and combination clutch/brake devices, are constructed with a gap between two armatures or pole pieces, and a shaft-mounted rotary member extends into the gap in spaced relation to the two armatures. The gaps between the opposite sides of the rotary member and the adjacent armatures is filled with magnetic particles which function as the clutching medium. U.S. Pat. Nos. 3394783, 3394784, 3620335, 3664473 and 3680671, and the references cited therein, exemplify the prior art to which this invention pertains.

Historically there has been a problem confining the magnetic particles to the gap. There also has been a problem in effectively confining the particles to the gap without undesirably increasing the drag on the rotary member. The particles are abrasive, and as they escape from the gap they become entrained in the rest of the device and erode it. The particles escaping from the gap also tend to cause the bearings to seize. Furthermore, the degree of coupling is related to the amount of particles present in the gap. As the quantity of particles in the gap diminishes, the same activating magnetic field results in a lesser degree of coupling, degrading the performance of the device.

Prior art magnetic particle devices have used a variety of seals for containing the magnetic particles in the space between the two armatures, e.g., felt packing, and lip, labyrinth and electromagnetic seals have been tried with only limited success. Electromagnetic seals leak when the power is turned off. The felt packing, lip and labyrinth seals ultimately allow particles to enter between the seal and shaft, resulting in erosion of the shaft and seal, which in turn allows more particles to leak from between the armatures and thereby accelerates ultimate failure of the device. The latter kind of seals also rely on contact between the seal and shaft, which results in undesirable drag on the shaft.

OBJECTS AND SUMMARY OF THE INVENTION

The primary object of the invention is to provide a novel seal which prevents leakage and migration of magnetic particles in a magnetic particle device.

Another object of the invention is to provide novel sealing means for magnetic particle devices which overcomes the limitations of prior sealing means.

A further object is to provide a novel sealing means for a magnetic particle device of the type described which results in extremely low friction against the rotary member and its mounting shaft so as to minimize the drag on the device in its de-energized state.

A further object of this invention is to provide a new method of sealing for preventing the migration of magnetic particles along rotary shafts.

Briefly described, the novel seal comprises at least one magnet which is placed about the shaft of a magnetic particle device at the gap to be sealed. The shaft of the device is made of a non-magnetic material. The at least one seal magnet is disposed so as to attract magnetic particles entering the gap to be sealed, forming a clot of those particles that prevents passage of additional particles along the gap. The influence of the magnetic field of the magnet(s) prevents particles from migrating from the clot. In a preferred embodiment of the invention, one or more annular magnets are held in a non-magnetic cup. The magnets and cup are close to but do not touch the shaft. Migrating magnetic particles are pulled into the magnetic field of the magnet(s) and are thereby held against further migration. Further aspects of the invention are set forth in the following detailed description of several embodiments of the inventions.

BRIEF DESCRIPTION OF THE DRAWINGS

FIGS. 3-12 are views similar to FIG. 2 showing alternative forms of seals made in accordance with the invention.

In the drawings, like parts are identified by like alphanumeric characters.

DESCRIPTION OF THE PREFERRED EMBODIMENT

Figure 1:
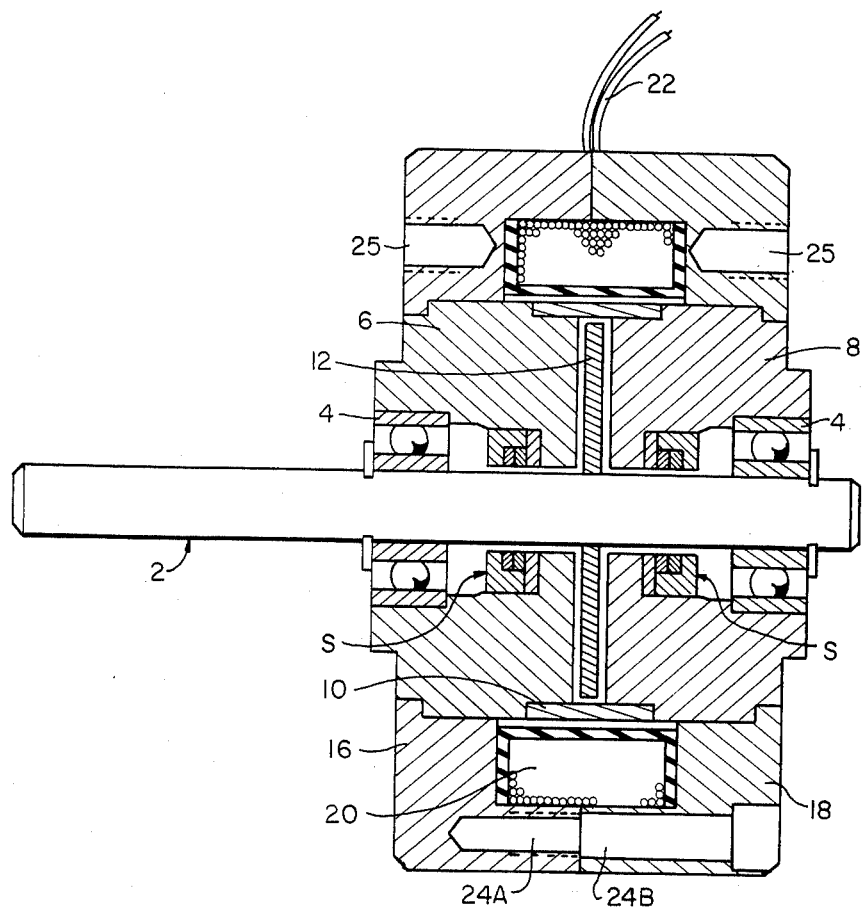
FIG. 1 is a longitudinal sectional view of a magnetic particle brake incorporating the present invention.
Figure 2:
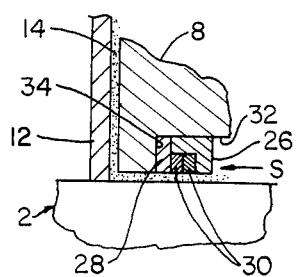
FIG. 2 is an enlarged fragmentary view of a portion of FIG. 1 showing a preferred embodiment of the shaft seal constituting the present invention.

In FIG. 1, there is illustrated a disk-type magnetic particle brake. Except for the provision of novel seals made in accordance with the invention, the brake illustrated in FIG. 1 is of conventional design. The illustrated brake comprises a non-magnetic shaft 2 which is supported for rotation by a pair of bearings 4 mounted in two mutually-spaced magnetic armatures or pole pieces 6 and 8. A non-magnetic spacer ring 10 is secured to the two armatures and keeps them separated so as to form a cavity between them. A magnetic disk 12 fixed to shaft 2 extends into the cavity between the two armatures. The disk is spaced from the two armatures and the resulting gaps between it and the armatures are filled with a supply of magnetic particles 14 (FIG. 2). For clarity of illustration, the magnetic particles 14 are not shown in FIG. 1.

Surrounding the pole pieces is a magnetic housing formed by two magnetic members 16 and 18. The latter form a cavity in which is contained a coil assembly 20. The latter is provided with terminal leads as shown at 22 for connecting it into an external electrical circuit. The two housing members 16 and 18 complete a magnetic path around the coil and have two or more sets of aligned holes 24A and 24B for receiving screws for securing the two members together. Holes 24A are threaded as shown. They also have have threaded holes 25 for receiving screws for securing the device to a fixed object.

The device is operated by passing an electric current through the coil. This creates a magnetic field which passes through disk 12, the two armatures 6 and 8 and the magnetic particles 14 which fill the gaps between the disk and the armatures. The magnetic particles couple the disk to the two armatures in proportion to the strength of the magnetic field.

FIG. 2 is an enlarged view of one of the seal areas of FIG. 1. Although the device of FIG. 1 has two shaft seals S, one on either side of the disk, only one seal is shown in FIG. 2 since the seals are identical in structure and differ only in their disposition in the magnetic particle brake.

Referring now to FIG. 2 in detail, each seal S encircles the shaft 2 and is an assembly consisting of a non-magnetic cup ring 26 of L-shaped cross-section, an annular non-magnetic spacer ring 28, and one or more annular magnets 30. Preferably, but not necessarily, each magnet is polarized axially, so that the side facing spacer ring 28 has one polarity and the side facing away from spacer ring 28 has the opposite polarity. Each of the armatures is formed with a seal-receiving groove 32 in its inner surface at the side facing away from disk 12. A shoulder 34 is formed by the groove. The seal is installed in groove 32 tight aginst shoulder 34. For each seal, the cup ring 26 and spacer ring 28 are sized so that the magnets are securely supported and prevented from moving relative to the associated armature. The cup ring may be secured to the armature in any suitable way, preferably by a press fit in groove 32. The inside diameters of the cup ring 26, spacer ring 28 and magnets 30 all exceed the diameter of shaft 2 by a small amount as shown in FIG. 2, so that there is no contact between the seal and shaft.

The novel seal provided by this invention is believed to work in the following manner. The magnetic particles 14 occupy the spaces between shaft 2, disk 12 and armatures. The magnetic flux of the seal magnets 30 extends into the gap between those magnets and shaft 2. This permanent magnetic field attracts nearby magnetic particles 14 and draws them into a clot between the seal and the shaft. This clot of magnetic particles then effectively blocks other particles from migrating past it along the shaft. The magnetic field of the seal magnets prevents magnetic particles from migrating away from the clot. The clot exists regardless of whether or not coil 20 in energized.

ALTERNATIVE EMBODIMENTS OF THE INVENTION

Figure 3:
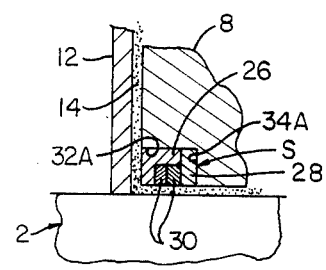

An alternative embodiment of the invention is shown in FIG. 3. The cup ring 26, spacer ring 28 and magnets 30 are all repeated as in FIG. 2, but in this case the annular seal-receiving groove 32A is in the side of the armature facing the disk 12. The seal is engaged with shoulder 34A. The cup ring 26 is press fitted into groove 32A to prevent the seal from moving.

A further modification is shown in FIG. 4. In this case the seal is the same as in FIG. 2 but the groove 32 is deeper and accomodates an annular magnetic armature insert ring 40 which is secured by a press fit. Ring 40 serves as an extension of the armature.

FIG. 5 shows a modification which is similar to FIG. 3 except that groove 32A is made deeper to accomodate an annular magnetic armature insert ring 40A which is press-fitted in place. In this case the insert ring confronts the disk 12 and becomes a part of the magnetic path between the disk and the armature.

FIG. 6 shows a modification similar to FIG. 2 but differing therefrom in that the shoulder 34 formed by the groove 32 has a smaller inner diameter, preferably but not necessarily equal to the internal diameter of the magnets 30. This design offers the advantage of reducing the risk of the seal's magnets being demagnetized by the flux field produced by energization of coil 20.

FIG. 7 shows a design which differs from that of FIG. 2 in that cup ring 26 and spacer ring 28 are omitted. Instead the two magnets 30 are secured in place by an annular magnetic armature insert ring 44 which is press-fitted in groove 32 and holds the magnets tight against the shoulder 34. The inner diameter of shoulder 34 and the inner diameter of insert ring 44 are larger than the inner diameter of magnets 30 to reduce the extent to which the magnets are affected by the flux field produced by energizing coil 20.

FIG. 8 shows a design which has the same components as the design of FIG. 7 but differs therefrom in that the groove 32A is at the side of the armature facing disk 12.

FIG. 9 shows a substantially different design in which the armature has a constant diameter inner surface 46 and the seal is fixed to and rotates with shaft 2. In this case, spacer ring 28 directly engages disk 12 and cup ring 26 makes a tight fit on shaft 2. The sealing gap is now between the inner surface 46 of the armature and the seal magnets 30. In this embodiment the shaft 2 may be magnetic or non-magnetic.

Figure 10:
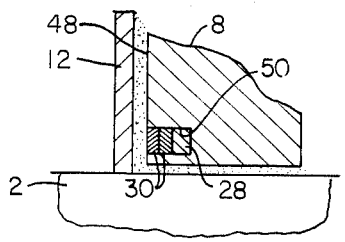

FIG. 10 shows still another modification. In this case the face 48 of each armature is provided with a circular groove 50 concentric with shaft 2 to accomodate the seal. The latter consists of a pair of annular magnets 30 and an annular non-magnetic spacer ring 28 disposed between the magnets and the base of the groove. Ring 28 serves to reduce the effect of the magnetic field generated by coil 20 on magnets 30. The magnets may be secured in place by a press fit or by a suitable adhesive or cement.

Figure 11:
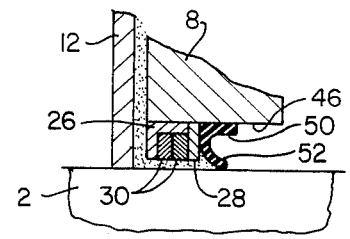

FIG. 11 shows a modification which is is intended to be used in the case where the magnetic particle device is to be installed in a system where the magnetic particle device is submerged in a liquid or exposed to liquid sprays. Here the inner surface 46 of the armature has a constant diameter, and the seal, consisting of cup ring 26, spacer ring 28 and magnets 30, is secured to that surface, e.g., by a press fit or by a suitable adhesive or cement. In addition, a resilient annular non-magnetic lip seal 50 is secured to inner surface 46 of the armature. The lip seal may be made of any suitable material, e.g., a silicone rubber. The lip seal has a lip 52 which extends away from the magnetic seal and engages shaft 2. The contact between lip 52 and shaft 2 is such that the shaft can rotate relative to the lip seal while the lip seal remains in engagement with the shaft. With this arrangement, the lip seal prevents liquid from entering the magnetic particle device and thereby extends the life of the devices.

Figure 12:
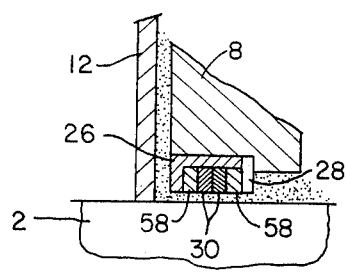

FIG. 12 shows a modification which is similar to that of FIG. 3 except that the magnets 30 are flanked by flat annular rings 58 made of a magnetically soft material, e.g., a material such as iron. Rings 58 modify the magnetic field within the gap between the magnetic seal and shaft 2.

Skilled practioners will recognize that there are other assemblies that may be used for containing the magnets without departing from principles of the invention.

Skilled practitioners also will appreciate that a magnetic particle clutch is quite similar to a magnetic particle brake, the primary difference between them being that a clutch comprises two coaxial members that are rotatable relative to the armature assembly and the housing (see the U.S. Patents listed hereinabove for examples of clutches, brakes and clutch/brake combinations). Therefore the magnetic seals of the present invention are not limited to magnetic particle brakes but have utility in magnetic particle clutches and also in clutch/brake combinations that have non-magnetic shafts.

While the invention has been described in connection with a typical disk-type magnetic particle device, the seals may be used in other types of magnetic particle devices, e.g., basket-type clutches or brakes and combination disk/basket type clutches or brakes, or even in other types of devices where it is desired to prevent migration of magnetic particles between two relatively movable surfaces, e.g., between two surfaces that operate in rectilinear motion instead of or in addition to rotary motion.

The invention has a number of advantages. For one thing there is no contact between the magnetic seals and the shaft, thereby eliminating drag on the shaft from the seals. Another advantage is that although the invention has been described as comprising annular magnets that are axially polarized, it is possible to practice the invention using magnets that are polarized radially. However, axially polarized magnets are preferred since they function more effectively in causing the magnetic particles to clot in the manner described above. A further advantage of the invention is that it is relatively inexpensive to practice and provides a long-lasting and effective magnetic particle sealing means. Still other advantages will be obvious to persons skilled in the art.

It is to be understood the invention is not intended to be limited in its application to the details of construction and arrangement of parts herein described or illustrated, and that within the scope of the claims, it may be practiced otherwise than as specifically described or illustrated.

What is claimed is:

1. A magnetic particle device having (a) at least two coaxial members arranged for rotation relative to one another, (b) a gap formed between mutually-confronting surfaces of at least two of said members, and (c) a supply of magnetic particles in contact with at least one of said members, one of said coaxial members being a shaft made of a non-magnetic material, improved sealing means for preventing magnetic particles which intrude into said gap from migrating in said gap along said mutually-confronting surfaces, said improved sealing means comprising at least one annular permanent magnet fixed to one of said mutually-confronting surfaces and disposed concentrically with and close to the other of said mutually-confronting surfaces, said at least one magnet having a magnetic field with a strength sufficient to cause intruding magnetic particles to agglomerate at said at least one magnet so as to block said gap and thereby prevent further migration of intruding particles.

2. In a magnetic particle device having a shaft made of a non-magnetic material, a radially-extending disk affixed to the shaft, an armature assembly comprising an annular magnetic armature member surrounding said shaft and confronting said disk, said armature member being spaced axially from said disk and radially from said shaft, magnetic particles positioned in the space between the disk and said armature member, means for rotatably supporting the shaft for rotation on its axis relative to said armature member, and electrically energizable means for establishing a magnetic field through the disk and said armature member so as to cause said particles to produce a torque-transmitting coupling between the disk and the armature assembly, the improvement comprising an improved sealing means for preventing the escape of magnetic particles from the space between the disk and said armature member, said sealing means comprising at least one annular magnet disposed in the space between said shaft and said armature member, said at least one magnet being secured to one of said shaft or said armature member and being spaced from the other of said shaft or said armature member, the field strength of said at least one magnet being sufficiently strong to attract and agglomerate magnetic particles which intrude into the space between said armature member and the shaft so as to form a clot of particles which effectively prevent the migration and escape of other particles lengthwise of said shaft.

3. A magnetic particle device comprising:
a shaft;
a radially-extending disk affixed to said shaft;
an armature assembly comprising first and second annular magnetic pole pieces surrounding said shaft on opposite sides of said disk, said pole pieces each having an annular end surface confronting and axially spaced from said disc and a cylindrical inner surface radially spaced from and close to said shaft;
a non-magnetic member extending between said first and second pole pieces and closing off the space between said pole pieces and said disc beyond the peripheral edge of said disk;
magnetic particles positioned in the space between said disk and said pole pieces;
means for rotatably supporting said shaft for rotation on its axis relative to said armature assembly;
electrically energizable means for establishing a magnetic field through said disk and said armature assembly so as to cause said particles to produce a torque-transmitting coupling between said disk and said pole pieces;
sealing means for preventing the escape of magnetic particles from the space between said disk and said pole pieces by migration between said shaft and said first pole piece, said sealing means comprising at least one annular magnet surrounding and spaced from said shaft, and a non-magnetic retaining means securing said at least one magnet to said cylindrical inner surface of said first pole piece adjacent said disc and close to said shaft, said retaining means comprising first and second axially spaced members between which said at least one magnet is sandwiched;
the field strength of said at least one magnet being sufficiently strong to attract and agglomerate magnetic particles which intrude into the space between said first pole piece and said shaft so as to form a clot of particles which effectively prevent the migration and escape of other particles lengthwise of said shaft.

4. Apparatus according to claim 3 comprising additional sealing means having at least one annular magnet surrounding and spaced from said shaft and non-magnetic retaining means securing said at least one magnet to said cylindrical inner surface of said second pole piece adjacent said disk and close to said shaft, said retaining means comprising first and second axially spaced members between which said at least one magnet is sandwiched, said additional sealing means serving to prevent escape of magnetic particles from the space between said disk and said pole pieces by migration between said shaft and said second pole piece.

5. Apparatus according to claim 4 wherein an annular groove is formed in said cylindrical inner surfaces of said first and second pole pieces adjacent said annular end surface and said sealing means are located in said grooves.

6. Apparatus according to claim 3 wherein said sealing means comprises a pair of annular rings of soft magnetic material flanking said at least one first annular magnet, and first and second axially spaced members of said non-magnetic retaining means hold said rings of soft magnetic material in contact with said at least one annular magnet.

7. Apparatus according to claim 3 wherein said shaft is made of non-magnetic material.

8. Apparatus according to claim 3 wherein said non-magnetic retaining means is flush with said annular end surface of said first pole piece.

9. Appartus according to claim 3 wherein said sealing means is spaced axially from said annular end surface of said first pole piece.

10. Apparatus according to claim 3 wherein said sealing means is secured in an annular groove formed in said cylindrical inner surface, said groove intersecting said annular end face of said first pole piece.

11. Apparatus according to claim 3 wherein said sealing means is located in an annular groove formed in said cylindrical inner surface of said first pole piece, said groove being spaced axially from said annular end face of said first pole piece.

12. Apparatus according to claim 3 wherein said non-magnetic retaining means comprises a non-magnetic cup ring of L-shaped cross section surrounding the outer circumferential edge and flanking a first side of said at least one annular magnet, and a non-magnetic spacer ring flanking a second side of said at least one annular magnet.

* * * * *